United States Patent
Choate, Jr. et al.

(10) Patent No.: US 7,649,040 B2
(45) Date of Patent: *Jan. 19, 2010

(54) FLAME RETARDANT FIBER REINFORCED COMPOSITION WITH IMPROVED FLOW

(75) Inventors: Kim R. Choate, Jr., Tokyo (JP); Robert Russell Gallucci, Mt. Vernon, IN (US); Nazan Gunduz, Corcelles (CH); Tsutomu Kinoshita, Moka (JP); Tatsuya Uchiyama, Tochigi (JP)

(73) Assignee: Sabic Innovative Plastics IP B.V. (NL)

( * ) Notice: Subject to any disclaimer, the term of this patent is extended or adjusted under 35 U.S.C. 154(b) by 275 days.

This patent is subject to a terminal disclaimer.

(21) Appl. No.: 11/625,804

(22) Filed: Jan. 22, 2007

(65) Prior Publication Data

US 2007/0179234 A1 Aug. 2, 2007

Related U.S. Application Data

(63) Continuation-in-part of application No. 10/638,631, filed on Aug. 11, 2003, now abandoned, and a continuation-in-part of application No. 10/510,998, filed as application No. PCT/US03/11141 on Apr. 11, 2003, now Pat. No. 7,244,778.

(30) Foreign Application Priority Data

Apr. 11, 2002 (JP) ............................. 2002-109570

(51) Int. Cl.
C08K 5/42 (2006.01)

(52) U.S. Cl. .................................................... 524/165
(58) Field of Classification Search .................. 524/165
See application file for complete search history.

(56) References Cited

U.S. PATENT DOCUMENTS

| | | | |
|---|---|---|---|
| 2,991,273 A | 7/1961 | Hechelhammer et al. |
| 2,999,835 A | 9/1961 | Goldberg et al. |
| 3,148,172 A | 9/1964 | Fox et al. |
| 3,153,008 A | 10/1964 | Fox et al. |
| 3,169,121 A | 2/1965 | Goldberg et al. |
| 3,271,367 A | 9/1966 | Schnell et al. |
| 3,271,368 A | 9/1966 | Goldberg et al. |
| 3,383,092 A | 5/1968 | Cuzier |
| 3,577,378 A | 5/1971 | Streib et al. |
| 3,634,355 A | 1/1972 | Barr et al. |
| 3,639,331 A | 2/1972 | Hattori |
| 3,671,487 A | 6/1972 | Abolins |
| 3,723,373 A | 3/1973 | Lucus |
| 3,803,085 A | 4/1974 | Takehoshi |
| 3,847,867 A | 11/1974 | Heath et al. |
| 3,850,885 A | 11/1974 | Takehoshi et al. |
| 3,852,242 A | 12/1974 | White |
| 3,855,178 A | 12/1974 | White et al. |
| 3,028,365 A | 3/1975 | Braue |
| 3,905,942 A | 9/1975 | Takehoshi et al. |
| 3,915,926 A | 10/1975 | Wambach |
| 3,971,756 A | 7/1976 | Bialous et al. |
| 3,972,902 A | 8/1976 | Heath et al. |
| 3,983,093 A | 9/1976 | Williams |
| 4,001,184 A | 1/1977 | Scott |
| 4,008,203 A | 2/1977 | Jones |
| 4,108,837 A | 8/1978 | Johnson |
| 4,123,436 A | 10/1978 | Scott et al. |
| 4,147,707 A | 4/1979 | Alewelt et al. |
| 4,175,175 A | 11/1979 | Johnson |
| 4,176,222 A | 11/1979 | Cinderey et al. |
| 4,197,232 A | 4/1980 | Bialous |
| 4,217,438 A | 8/1980 | Brunnelle |
| 4,256,862 A * | 3/1981 | Binsack et al. ............... 525/534 |
| 4,358,556 A | 11/1982 | van Abeelen |
| 4,366,276 A * | 12/1982 | Freitag et al. ................. 524/94 |
| 4,387,193 A | 6/1983 | Giles et al. |
| 4,443,591 A | 4/1984 | Schmidt et al. |
| 4,455,410 A | 6/1984 | Giles |
| 4,468,506 A | 8/1984 | Holub et al. |
| 4,487,896 A | 12/1984 | Mark et al. |
| 4,518,997 A | 5/1985 | Beckman |
| 4,543,368 A | 9/1985 | Smearing et al. |
| 4,548,997 A | 10/1985 | Mellinger et al. |
| 4,629,759 A | 12/1986 | Rock |
| 4,690,997 A | 9/1987 | Cella et al. |
| 4,808,686 A | 2/1989 | Cella et al. |
| 4,816,527 A | 3/1989 | Rock |

(Continued)

FOREIGN PATENT DOCUMENTS

CA 847963 7/1978

(Continued)

OTHER PUBLICATIONS

European Search Report for Application No. 07114908.2, mailed Oct. 24, 2007, 11 pages.

(Continued)

Primary Examiner—Peter Szekely
(74) Attorney, Agent, or Firm—Cantor Colburn LLP

(57) ABSTRACT

A composition comprising at least one high Tg amorphous resin with a fibrous filler shows improved melt processability. Addition of a sulfonate salt to the compositions gives increased melt flow as well as enhanced flame retardancy in a composition which is substantially free of bromine and chlorine.

37 Claims, No Drawings

U.S. PATENT DOCUMENTS

| | | | |
|---|---|---|---|
| 4,826,916 A | 5/1989 | Policastro et al. | |
| 4,855,356 A | 8/1989 | Holub et al. | |
| 4,908,418 A | 3/1990 | Holub | |
| 4,908,419 A | 3/1990 | Holub | |
| 4,918,125 A | 4/1990 | Boutni | |
| 4,981,894 A | 1/1991 | Nye et al. | |
| 5,026,767 A | 6/1991 | Inoue et al. | |
| 5,026,890 A | 6/1991 | Webb et al. | |
| 5,028,681 A | 7/1991 | Peters | |
| 5,051,483 A | 9/1991 | Rock et al. | |
| 5,104,958 A | 4/1992 | Bolon et al. | |
| 5,106,915 A | 4/1992 | Rock et al. | |
| 5,280,085 A | 1/1994 | Rock et al. | |
| 5,360,861 A | 11/1994 | Campbell | |
| 5,387,639 A | 2/1995 | Sybert et al. | |
| 5,424,344 A * | 6/1995 | Lewin | 524/83 |
| 5,521,230 A | 5/1996 | Bhatia et al. | |
| 5,521,258 A | 5/1996 | Cooper et al. | |
| 5,986,016 A | 11/1999 | Puyenbroek et al. | |
| 6,011,122 A | 1/2000 | Puyenbroek | |
| 6,072,010 A | 6/2000 | Puyenbroek | |
| 6,080,833 A | 6/2000 | Otsuji et al. | |
| 6,310,145 B1 | 10/2001 | Puyenbroek et al. | |
| 6,355,767 B1 | 3/2002 | Takagi et al. | |
| 6,417,255 B1 | 7/2002 | Penning et al. | |
| 6,475,588 B1 | 11/2002 | Schottland et al. | |
| 6,518,347 B1 | 2/2003 | Boyd et al. | |
| 6,727,302 B2 | 4/2004 | Goossens et al. | |
| 6,730,720 B2 | 5/2004 | Gohr et al. | |
| 7,244,778 B2 * | 7/2007 | Choate et al. | 524/395 |
| 2002/0115791 A1 * | 8/2002 | Duncan et al. | 525/100 |
| 2005/0038145 A1 | 2/2005 | Gallucci et al. | |
| 2005/0048299 A1 | 3/2005 | Gallucci et al. | |
| 2005/0131105 A1 | 6/2005 | Choate et al. | |

FOREIGN PATENT DOCUMENTS

| | | |
|---|---|---|
| EP | 0 131 643 | 1/1985 |
| EP | 0138129 | 4/1985 |
| EP | 0 224 696 | 6/1987 |
| EP | 0 266 595 | 5/1988 |
| EP | 0 293 904 | 12/1988 |
| EP | 0 418 719 | 3/1991 |
| EP | 0 519 657 | 12/1992 |
| EP | 0 594 386 | 4/1994 |
| EP | 0 628 600 | 12/1994 |
| GB | 2203744 | 10/1988 |
| WO | WO 8202895 | 9/1982 |
| WO | WO8404752 | 12/1984 |
| WO | WO0248241 | 6/2002 |
| WO | WO2004076541 | 9/2004 |
| WO | 2005030839 | 4/2005 |

OTHER PUBLICATIONS

ASTM D1238-01 "Standard Test Method For Melt Flow Rates of Thermoplastics by Extrusion Plastometer" 12 pages.

ASTM D1003-00 "Standard Test Method for Haze Luminous Transmittance Of Transparent Plastics" pp. 202-207.

ASTM D3418-99 "Standard Test Method for Transition Temperatures of Polymers by Differential Scanning Calorimetry" pp. 337-341.

ASTM D6394-02 "Standard Specification for Sulforn Plastics" pp. 984-987.

UL94 Standards for Saftey; Test for Flammability of Plastic Materials for Parts in Devices and Appliances; pp. 13-17.

International Search Report for International Application No. PCT/US2004/026180, International Filing Date Aug. 12, 2004, Date of Mailing Nov. 25, 2004, 6 pages.

International Search Report for International Application No. PCT/US2006/035819, mailed 42007-04-25, 4 pages.

Written Opinion for International Search Report for International Application No. PCT/US2006-035819, mailed Apr, 25, 2007, 4 pages.

* cited by examiner

US 7,649,040 B2

FLAME RETARDANT FIBER REINFORCED COMPOSITION WITH IMPROVED FLOW

CROSS REFERENCE TO RELATED APPLICATIONS

This application is a continuation-in-part of U.S. patent application Ser. No. 10/638,631 filed on Aug. 11,2003, abandoned, and U.S. patent application Ser. No. 10/510,998 filed on Oct. 12, 2004, now U.S. Pat. No. 7,244,778, both of which are incorporated by reference herein. U.S. patent application Ser. No. 10/510,998 is a National Phase Application of Patent Application No. PCT/U503/11141 filed on Apr. 11, 2003, which claims priority to Japanese Patent Application No. 2002-109570 filed on Apr. 11, 2002.

BACKGROUND OF THE INVENTION

Disclosed herein are fiber reinforced thermoplastic compositions comprising at least one of a polyimide, polysulfone, polycarbonate, polyestercarbonate or polyarylate. The thermoplastic compositions contain uniformly dispersed fibers that provide formed parts with improved strength and modulus compared to the compositions with no fiber. The compositions further comprise a sulfonate salt that improves ignition resistance and has a surprisingly beneficial effect on increasing melt flow.

Glass and mineral fibers are commonly used in compositions with engineering thermoplastics to improve strength and modulus. However, addition of these fibers has such drawbacks as increase in weight, loss of elongation, appearance of anisotropic properties and loss of melt flow in the resulting compositions. The loss of melt flow is especially troublesome in amorphous thermoplastic resins with high glass transition temperature (Tg) (i.e. those with Tg greater than 145° C.). High Tg amorphous thermoplastic resins with useful mechanical properties are high molecular weight and generally are more difficult to melt process than higher flowing crystalline resins. In fiber-containing compositions of high Tg resins the melt flow is further reduced over that of the base resins not containing fiber. In many instances the only resort to mold parts from such compositions is to increase temperature in molding equipment. However, the very high temperatures encountered (typically 300-400° C.) can often result in thermal degradation of the thermoplastic resin leading to the loss of properties and/or the generation of volatile products producing unacceptable molded parts. Thus there exists a need to improve the melt flow and processability of fiber-filled high Tg amorphous thermoplastic compositions.

In addition some high Tg thermoplastic resins are more easily ignited than others rendering them unfit for some applications where the ignition and burning of fiber filled plastic parts may be a concern. This is true of some blends of polycarbonate (PC) with polyetherimide (PEI) as described in U.S. Pat. No. 4,548,997 and related blends comprising PEI and polyarylate resins that are disclosed in U.S. Pat. Nos. 4,908,418 and 4,908,419.

Efforts to improve the flame retardancy of PC-PEI blends with brominated polystyrene resin are disclosed in U.S. Pat. No. 4,629,759. Use of brominated flame retardants often causes problems due to the decomposition of the brominated compound at high melt processing temperature of these blends giving acidic species that can corrode molds and machinery. In addition halogenated flame retardants are becoming increasing unpopular in some areas due to potential environmental concerns.

Several other patents, for instance U.S. Pat. Nos. 5,051,483 and 6,011,122, describe the addition of silicone polyetherimide copolymers to improve flame retardant (FR) properties of PC-PEI compositions. While effective, use of an additional ingredient such as a silicone copolymer adds expense and complexity to the manufacture of said composition.

Another issue of blends such as those of PC with PEI is their poor melt processing characteristics when combined in the ratio of about 30-70 to 70-30. These blends are very difficult to compound on an extruder and show surging and excessive die swell with poor melt elasticity. The blend extrudate is very hard to strand and cut into pellets. This limits the use of such blends. Typically the addition of even a small amount of fiber glass removes the melt flow instability. The glass fibers also improve strength and modulus of the blend. However the melt flow of the blend, while more uniform, is reduced. This reduction in melt flow makes it harder to mold parts. Therefore, while there has been significant work in this area several problems still exist with regard to preparing flame and ignition resistant fiber filled high Tg amorphous thermoplastic compositions.

BRIEF DESCRIPTION OF THE INVENTION

It has now been found that the addition of surprisingly low levels of sulfonate salts to fiber filled high Tg amorphous thermoplastic compositions solves problems of previous compositions and at the same time gives improved flow and improved FR properties while retaining the other desirable features of the resin compositions. The improved flow makes part molding easier. The uniformity of the melt flow achieved by addition of the fibers is also retained. In addition the sulfonate salt acts as a flame retardant improving the ignition resistance of the amorphous thermoplastic compositions.

In one embodiment a flame retardant thermoplastic resin composition having improved melt flow comprises:

(a) a polyimide, a polysulfone or mixture thereof;

(b) a fibrous reinforcement selected from the group consisting of: fiber glass, carbon fiber and ceramic fiber; and (c) a sulfonate salt.

In some embodiments a flame retardant thermoplastic resin composition having improved melt flow comprises:

(a) a polyimide, a polysulfone or mixture thereof;

(b) an amorphous polycarbonate, polyestercarbonate or polyarylate polymer, or mixture thereof, comprising recurring units of the formula

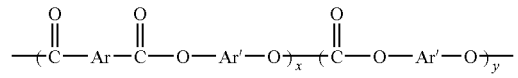

wherein Ar is a divalent aromatic residue of a dicarboxylic acid or mixture of dicarboxylic acids and Ar' is a divalent aromatic residue of a dihydroxy-substituted aromatic hydrocarbon or mixture of dihydroxy-substituted aromatic hydrocarbons and wherein, based on mole percent, x and y each have a value of between 0 and 100 percent and the total of x and y is 100 percent;

(c) a fibrous reinforcement selected from the group consisting of: fiber glass, carbon fiber and ceramic fiber; and (d) a sulfonate salt.

Various other features, aspects, and advantages of the thermoplastic compositions will become more apparent with reference to the following description and appended claims.

DETAILED DESCRIPTION OF THE INVENTION

In some embodiments a thermoplastic amorphous resin can be chosen from the group consisting of polyimides and polysulfones. Such amorphous resins typically have a glass transition temperature (Tg), as measured by DSC, of greater than or equal to 145° C. In some embodiments, thermoplastic resins with a Tg greater than or equal to 170° C. are used. In some embodiments amorphous resins with a Tg greater than or equal to 200° C. are used.

Polysulfones include polyether sulfones, polyaryl ether sulfones, polyphenylene ether sulfones and combinations of two or more of the foregoing. Polysulfones are thermoplastic polymers that possess a number of attractive features such as high temperature resistance, good electrical properties, and good hydrolytic stability. A variety of polyaryl ether sulfones are commercially available, including the polycondensation product of dihydroxydiphenyl sulfone with dichlorodiphenyl sulfone and known as polyether sulfone (PES) resin, and the polymer product of bisphenol A and dichlorodiphenyl sulfone, which is a polyether sulfone sometimes referred to in the art simply as polysulfone (PSF) resin. A variety of polyether sulfone copolymers, for example comprising bisphenol A moieties and diphenyl sulfone moieties in molar ratios other than 1:1, are also known in the art.

Other polyaryl ether sulfones are the polybiphenyl ether sulfone resins, available from Solvay S. A. Inc. under the trademark of RADEL R resin. This resin may be described as the polycondensation product of biphenol with 4,4'-dichlorodiphenyl sulfone and also is known and described in the art, for example, in Canadian Patent No. 847,963.

Methods for the preparation of polysulfones are widely known and several suitable processes, such as the carbonate method and the alkali metal hydroxide method, have been well described in the art. In the alkali metal hydroxide method, a double alkali metal salt of a dihydroxy-substituted aromatic hydrocarbon is contacted with a dihalobenzenoid compound in the presence of a dipolar, aprotic solvent under substantially anhydrous conditions. In the carbonate method at least one dihydroxy-substituted aromatic hydrocarbon and at least one dihalobenzenoid compound are heated, for example, with sodium carbonate or bicarbonate and a second alkali metal carbonate or bicarbonate as disclosed in the art, for example in U.S. Pat. No. 4,176,222. Alternatively, the polybiphenyl ether sulfone, PSF and PES resin components may be prepared by any of the variety of methods known in the art for the preparation of polyaryl ether resins. Thermoplastic polyethersulfones and methods for their preparation are also described in U.S. Pat. Nos. 3,634,355; 4,008,203; 4,108,837 and 4,175,175.

The molecular weight of the polysulfone, as indicated by reduced viscosity data in an appropriate solvent such as methylene chloride, chloroform, N-methyl pyrrolidinone, or the like, is in various embodiments at least 0.3 deciliters per gram (dl/g), or, more specifically, at least 0.4 dl/g and, typically, will not exceed about 1.5 dl/g.

Thermoplastic polyimides can be derived from reaction of aromatic dianhydrides or aromatic tetracarboxylic acids or their derivatives capable of forming cyclic anhydrides, and aromatic diamines or their chemically equivalent derivatives, to form cyclic imide linkages.

In various embodiments suitable thermoplastic polyimides comprise structural units of formula (I)

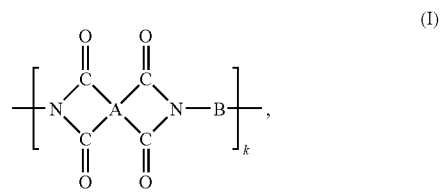

where "A" comprises structural units derived from at least one dianhydride; and "B" comprises structural units derived from at least one aromatic diamine.

In some embodiments the moiety "A" has the formula (II):

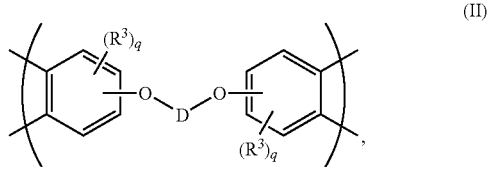

wherein $R^3$ is selected from the group consisting of halogen, fluoro, chloro, bromo, $C_{1-32}$ alkyl, cycloalkyl, or alkenyl; $C_{1-32}$ alkoxy or alkenyloxy; cyano, and "q" has a value of 0-3. In some particular embodiments the value of "q" is zero.

In the formula (II), "D" is a divalent aromatic group derived from a dihydroxy substituted aromatic hydrocarbon, and has the general formula (III):

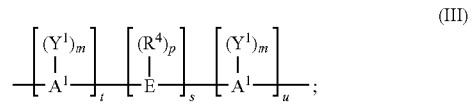

where "$A^1$" represents an aromatic group including, but not limited to, phenylene, biphenylene, naphthylene, etc. In some embodiments, "E" may be an alkylene or alkylidene group including, but not limited to, methylene, ethylene, ethylidene, propylene, propylidene, isopropylidene, butylene, butylidene, isobutylidene, amylene, amylidene, isoamylidene, etc. In other embodiments, when "E" is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, etc.; or a phosphorus-containing linkage including, but not limited to, phosphinyl, phosphonyl, etc. In other embodiments, "E" may be a cycloaliphatic group non-limiting examples of which include cyclopentylidene, cyclohexylidene, 3,3,5-trimethylcyclohexylidene, methylcyclohexylidene, bicyclo[2.2.1]hept-2-ylidene, 1,7,7-trimethylbicyclo[2.2.1]hept-2-ylidene, isopropylidene, neopentylidene, cyclopentadecylidene, cyclododecylidene, and adamantylidene; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^4$ represents hydrogen or a monovalent hydrocarbon group including, but not limited to, alkenyl, allyl, alkyl, aryl, aralkyl, alkaryl, or cycloalkyl. In various embodiments a monovalent hydrocarbon group of $R^4$ may be halogen-substituted, particularly fluoro- or chloro-substituted, for example as in dihaloalkylidene group of formula $C=CZ_2$, wherein each Z is hydrogen, chlorine, or bromine, subject to the provision that at least one Z is chlorine or bromine; and mixtures of the foregoing moieties. In a particular embodiment, the dihaloalkylidene group is a dichloroalkylidene, particularly gem-dichloroalkylidene group. $Y^1$ may be hydrogen; an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^5$ wherein $R^5$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "m" represents any integer from and including zero through the number of positions on $A^1$ available for substitution; "p" represents an integer from and including zero through the number of positions on E available for substitution; "t" represents an integer equal to at least one; "s" represents an integer equal to either zero or one; and "u" represents any integer including zero. In some particular embodiments "u" is an integer with a value of 0 to about 5.

In dihydroxy-substituted aromatic hydrocarbons in which "D" is represented by formula (III) above, when more than one $Y^1$ substituent is present, they may be the same or different. The same holds true for the $R^1$ substituent. Where "s" is zero in formula (III) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons, "E" may be an unsaturated alkylidene group. Suitable dihydroxy-substituted aromatic hydrocarbons of this type include those of the formula (IV):

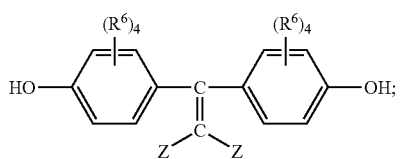

where each $R_6$ is independently hydrogen, chlorine, bromine, or a $C^{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (V):

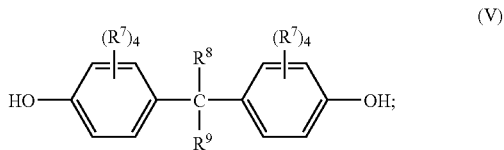

where each $R_7$ is independently hydrogen, chlorine, bromine, or a $C^{1-30}$ monovalent hydrocarbon or hydrocarbonoxy group, and $R^8$ and $R^9$ are independently hydrogen or a $C_{1-30}$ hydrocarbon group.

In embodiments, dihydroxy-substituted aromatic hydrocarbons that may be used include those disclosed by name or formula (generic or specific) in U.S. Pat. Nos. 2,991,273, 2,999,835, 3,028,365, 3,148,172, 3,153,008, 3,271,367, 3,271,368, and 4,217,438. In some embodiments, dihydroxy-substituted aromatic hydrocarbons include, but are not limited to, bis(4-hydroxyphenyl)sulfide, bis(4-hydroxyphenyl)ether, bis(4-hydroxyphenyl)sulfone, bis(4-hydroxyphenyl)sulfoxide, 1,4-dihydroxybenzene, 4,4'-oxydiphenol, 2,2-bis (4-hydroxyphenyl)hexafluoropropane, 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; $C_{1-3}$ alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl) propane; bis(3,5-dimethylphenyl-4-hydroxyphenyl) methane; 1,1-bis(3,5-dimnethylphenyl-4-hydroxyphenyl) ethane; 2,2-bis(3,5-dimethylphenyl-4-hydroxyphenyl) propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-ditnethylphenyl-4-hydroxyphenyl)cyclohexane; bis(3,5-dimethyl-4-hydroxyphenyl) sulfoxide, bis(3,5-dimethyl-4-hydroxyphenyl) sulfone and bis(3,5-dimethylphenyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when the moiety "E" is an alkylene or alkylidene group, it may be part of one or more fused rings attached to one or more aromatic groups bearing one hydroxy substituent. Suitable dihydroxy-substituted aromatic hydrocarbons of this type include those containing indane structural units such as 3-(4-hydroxyphenyl)-1,1,3-trimethylindan-5-ol and 1-(4-hydroxyphenyl)-1,3,3-trimethylindan-5-ol. Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols, illustrative examples of which include 2,2,2',2'-tetrahydro-3,3,3',3'-tetramethyl-1,1'-spirobi[1H-indene]-6,6'-diol (sometimes known as "SBI"). Mixtures comprising any of the foregoing dihydroxy-substituted aromatic hydrocarbons may also be employed.

In other embodiments "A" has the formula (VI) or (VII):

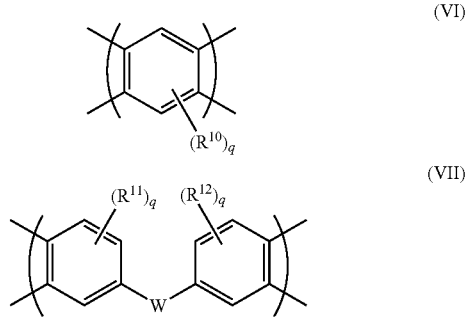

(VI)

(VII)

wherein $R^{10}$-$R^{12}$ each are independently selected from hydrogen, halogen, and $C_1$-$C_6$ alkyl groups; "q" is an integer having a value of 1 up to the number of positions available on the aromatic ring for substitution; and "W" is a linking group. In particular embodiments W is a covalent bond, oxygen, sulfur, sulfoxide, sulfone, silicon, carbonyl, or hexafluoro isopropylidene. In some particular embodiments polyimides comprise structural units derived from at least one dianhydride selected from the group consisting of 2,2-bis[4-(3,4-dicarboxyphenoxy)phenyl]propane dianhydride, 2,2-bis[4-(2,3-dicarboxyphenoxy)phenyl]propane dianhydride; 2-[4-(3,4-dicarboxyphenoxy)phenyl]-2-[4-(2,3-dicarboxyphenoxy)phenyl]propane dianhydride, 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; -4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, 1,4,5,8-naphthalenetetracarboxylic acid dianhydride, 3,4,3',4'-benzophenonetetracarboxylic acid dianhydride, 3,3',4,4'-oxydiphthalic anhydride, 3,3',4,4'-biphenyltetracarboxylic acid dianhydride, 2,3,2',3'-biphenyltetracarboxylic acid dianhydride, pyromellitic dianhydride, 3,4,3',4'-diphenylsulfonetetracarboxylic acid dianhydride, 4,4'-bis(3,4-dicarboxyphenoxy)diphenyl sulfide dianhydride, 1,4-bis(3,4-dicarboxyphenoxy)benzene dianhydride, bis[4-(3,4-dicarboxyphenoxy)phenyl]ether dianhydride, and 2,2-bis(3,4-dicarboxyphenyl)hexafluoropropane dianhydride. Polyimides with structural units derived from mixtures comprising at least two dianhydrides are also within the scope of the invention.

In various embodiments suitable aromatic diamines comprise a divalent organic radical selected from aromatic hydrocarbon radicals having 6 to about 22 carbon atoms and substituted derivatives thereof In various embodiments said aromatic hydrocarbon radicals may be monocyclic, polycyclic or fused.

In some embodiments suitable aromatic diamines comprise divalent aromatic hydrocarbon radicals of the general formula (VIII)

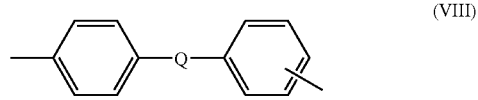

(VIII)

wherein the unassigned positional isomer about the aromatic ring is either meta or para to Q, and Q is a covalent bond or a member selected from the group consisting of formulas (IX):

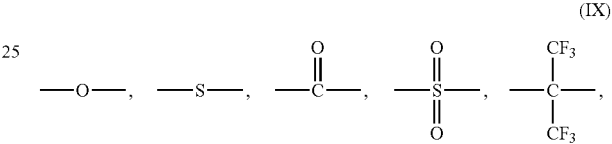

(IX)

and an alkylene or alkylidene group of the formula $C_yH_{2y}$, wherein y is an integer from 1 to 5 inclusive. In some particular embodiments y has the value of one or two. Illustrative linking groups include, but are not limited to, methylene, ethylene, ethylidene, vinylidene, halogen-substituted vinylidene, and isopropylidene. In other particular embodiments the unassigned positional isomer about the aromatic ring in formula (VII) is para to Q.

In various embodiments the two amino groups in diamine-derived aromatic hydrocarbon radicals are separated by at least two and sometimes by at least three ring carbon atoms. When the amino group or groups are located in different aromatic rings of a polycyclic aromatic moiety, they are often separated from the direct linkage or from the linking moiety between any two aromatic rings by at least two and sometimes by at least three ring carbon atoms. Illustrative non-limiting examples of aromatic hydrocarbon radicals include phenyl, biphenyl, naphthyl, bis(phenyl)methane, bis(phenyl)-2,2-propane, and their substituted derivatives. In particular embodiments substituents include one or more halogen groups, such as fluoro, chloro, or bromo, or mixtures thereof, or one or more straight-chain-, branched-, or cycloalkyl groups having 1 to 22 carbon atoms, such as methyl, ethyl, propyl, isopropyl, tert-butyl, or mixtures thereof In particular embodiments substituents for aromatic hydrocarbon radicals, when present, are at least one of chloro, methyl, ethyl or mixtures thereof. In other particular embodiments said aromatic hydrocarbon radicals are unsubstituted. In some particular embodiments suitable diamines include, but are not limited to, meta-phenylenediamine; para-phenylenediamine; mixtures of meta- and para-phenylenediamine; isomeric 2-methyl -and 5-methyl-4,6-diethyl-1,3-phenylenediamines or their mixtures; bis(4-aninophenyl)-2,2-propane; bis(2-chloro-4-amino-3,5-diethylphenyl)methane, 4,4'-diaminodiphenyl, 3,4'-diaminodiphenyl, 4,4'-diaminodiphenyl ether (sometimes referred to as 4,4'-oxydianiline); 3,4'-diaminodiphenyl ether, 4,4'-diaminodiphenyl sulfone, 3,4'-diaminodiphenyl sulfone, 4,4'-diaminodiphenyl sulfide; 3,4'-diaminodiphenyl sulfide; 4,4'-diaminodiphenyl ketone, 3,4'-diaminodiphenyl ketone, 4,4'-diaminodiphenylmethane (commonly named 4,4'-methylenedianiline); 1,5-diaminonaphthalene; 3,3-dimethylbenzidine; 3,3-dimethoxybenzidine; benzidine; m-xylylenediamine; 1,3-diamino-4-isopropylbenzene; 1,2-bis(3-aminopropoxy)ethane; 2,4-bis(beta-amino-t-butyl)toluene; bis(p-beta-methyl-o-aminophenyl)benzene; bis(p-beta-amino-t-butylphenyl)ether and 2,4-toluenediamine. Mixtures of diamines may also be employed. In some embodiments the diamines can be one or more of meta - and para-phenylene diamines, diamino diphenyl sulfone and oxydianiline. Exemplary polyimide resins are polyetherimides and polyetherimide sulfones.

Generally, useful polyimide resins have an intrinsic viscosity greater than about 0.2 deciliters per gram, and more specifically, about 0.35 to about 1.0 deciliter per gram measured in chloroform or m-cresol at 25° C.

In one embodiment, the high Tg amorphous resins have a weight average molecular weight of about 10,000 to about 75,000 grams per mole (g/mol), or, more specifically about 10,000 to about 65,000 g/mol, and even more specifically, about 10,000 to about 55,000 g/mol, as measured by gel permeation chromatography, using a polystyrene standard.

A variety of polycarbonates and polyarylates can also be blended with fiber and sulfonate salts to give flame resistant compositions with improved melt flow. The term polycarbonate includes a variety of polycarbonate resins with structural units derived from dihydroxy-substituted aromatic hydrocarbons. Optionally, said structural units may additionally contain structural units derived from copolymerization with aromatic dicarboxylic acids or their derivates, such as dicarboxylic acid halides. Thus the term polycarbonate resin is understood to encompass polycarbonate homopolymers and polyestercarbonate copolymers. The polycarbonate, polyestercarbonate or polyarylate resins used in combination with the sulfonate salt, fiber, and polyimide or polysulfone can be described by the formula (X):

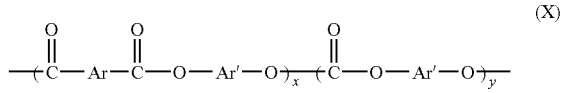
(X)

wherein Ar is a divalent aromatic residue of a dicarboxylic acid or mixture of dicarboxylic acids and Ar' is a divalent aromatic residue of a dihydroxy-substituted aromatic hydrocarbon or mixture of dihydroxy-substituted aromatic hydrocarbons. For the polycarbonate homopolymer resins x is 0. For the polyestercarbonate copolymer resins x is 1-99 and y is 99-1 mole percent. When y is 0 (i.e. where the carbonate linkages are absent) the aromatic polyester resin is known as a polyarylate resin. The polycarbonate, polyestercarbonate and polyarylate resins represent a continuum of structures and give enhanced properties when blended with fibers, sulfonate salts and polysulfones, polyimides or a combination thereof.

In some polyestercarbonate (PEC) or polyarylate (PAr) resins of formula I, y is 0 to about 80, or, more specifically, about 5 to about 70 and x is about 20 to about 100, or, more specifically, about 30 to about 95 mole percent. More specifically x is 50 to about 95 and even more specifically 60 to 80 mole percent. In some embodiments Ar in formula (I) is the residue from isophthalate or terephthalate or mixtures thereof, and has the formula (XI):

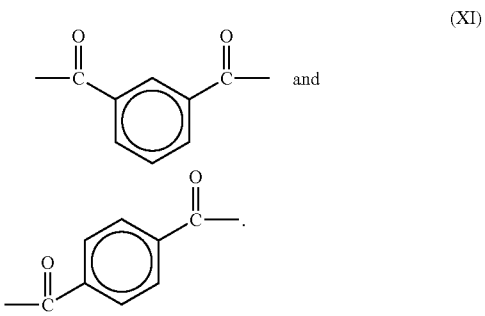

Dihydroxy-substituted aromatic hydrocarbons which may be employed in the synthesis of polycarbonates include, but are not limited to, all those dihydroxy-substituted aromatic hydrocarbon described hereinabove. It is, of course, possible to employ two or more different dihydroxy-substituted aromatic hydrocarbons or a combination of at least one dihydroxy-substituted aromatic hydrocarbon with a glycol.

In some particular embodiments the divalent residue of dihydroxy-substituted aromatic hydrocarbons, Ar' may be represented by the general formula (XII):

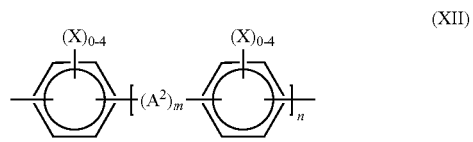

wherein $A^2$ is a substituted or unsubstituted divalent hydrocarbon radical comprising 1 to about 15 carbon atoms or a linking group such as —S—; —SO$_2$— or —O—; each X is independently selected from the group consisting of a monovalent hydrocarbon radical such as an alkyl group of 1 to about 8 carbon atoms, an aryl group of 6 to about 18 carbon atoms, an aralkyl group of 7 to about 14 carbon atoms, and an alkoxy group of 1 to about 8 carbon atoms; m is 0 or 1 and n is an integer of 0 to about 5.

The polymers may be prepared by a variety of methods, for example by either melt polymerization or by interfacial polymerization. Melt polymerization methods to make PC, PEC and polyarylate resins may involve co-reacting, for example, various mixtures comprising at least one dihydroxy-substituted aromatic hydrocarbon and at least one ester precursor such as, for example, diphenyl derivatives of iso- and terephthalates, and their mixtures. Diphenyl carbonate may be introduced to prepare polyestercarbonate copolymers or used alone to make the polycarbonate resins. Various catalysts or mixtures of catalysts such as, for example, lithium hydroxide and lithium stearate can also be used to accelerate the polymerization reactions. A discussion of polyarylate resins and their synthesis is contained in chapter 10, pp. 255-281 of "Engineering Thermoplastics Properties and Applications" edited by James M. Margolis, published by Marcel Dekker Inc. (1985). In some embodiments the polyarylates are derived from bisphenol A with mixture of isophthalic and terephthalic acid.

In general, the method of interfacial polymerization comprises the reaction of a dihydroxy-substituted aromatic hydrocarbon with a dicarboxylic acid or derivative ester precursor and/or a carbonate precursor, in a two phase water/organic solvent system with catalyst and often an acid acceptor when the dicarboxylic acid and carbonate precursors are diacid halides. Although the reaction conditions of the preparative processes may vary, several processes typically involve dissolving or dispersing dihydroxy-substituted aromatic hydrocarbon reactants in aqueous caustic, combining the resulting mixture with a suitable water immiscible solvent medium and contacting the reactants with the carbonate precursor and diacids or derivatives, such as diacid chlorides, in the presence of a suitable catalyst and under controlled pH conditions. The most commonly used water immiscible solvents include methylene chloride, 1,2-dichloroethane, chlorobenzene, toluene, and the like. Representative catalysts include but are not limited to, for example, tertiary amines such as triethylamine, quaternary phosphonium compounds, quaternary ammonium compounds, and the like. Examples of interfacial polymerization techniques can be found, for example, in U.S. Pat. Nos. 3,169,121 and 4,487,896.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydroxy-substituted aromatic hydrocarbons such as bischloroformates of 2,2-bis(4-hydroxy-3,5-dimethylphenyl)propane, hydroquinone, and the like, or bishaloformates of glycol, and the like. While all of the above carbonate precursors are useful, carbonyl chloride, also known as phosgene, is typically used.

In general, any dicarboxylic acid conventionally used in the preparation of polyesters may be utilized in the preparation of polyestercarbonate resins. However, the PEC resins herein typically comprise structural units derived from aromatic dicarboxylic acids, and in particular terephthalic acid, and mixtures thereof with isophthalic acid, wherein the weight ratio of terephthalic acid to isophthalic acid is in the range of about 5:95 to about 95:5.

Rather than utilizing the dicarboxylic acid, it is possible to employ various derivatives of the acid moiety. Illustrative of these reactive derivatives are the acid halides. Acid halides include the acid dichlorides and the acid dibromides. Thus, for example instead of using terephthalic acid or mixtures thereof with isophthalic acid, it is possible to employ terephthaloyl dichloride, and mixtures thereof with isophthaloyl dichloride.

In the conventional interfacial polymerization methods of preparing polyestercarbonates, polycarbonates and polyarylates, a molecular weight regulator (i.e. a chain stopper) is generally added to the reaction mixture prior to or during the polymerization reaction with carbonate and/or ester precursors. Useful molecular weight regulators include, for example, monohydric phenols such as phenol, chroman-I, para-t-butylphenol, p-cumylphenol and the like. All types of polycarbonate, polyestercarbonate and polyarylate end groups are contemplated.

The proportions of reactants employed to prepare polyestercarbonates will vary in accordance with the proposed use of the compositions comprising this product resin. In general, the amount of the combined ester units may be about 20% by weight to about 100% by weight, relative to the carbonate units.

An exemplary polyestercarbonates for use in the compositions are those derived from reaction of bisphenol A and phosgene with iso- and terephthaloyl chloride, and having an intrinsic viscosity of about 0.5 to about 0.65 deciliters per gram (measured in methylene chloride at a temperature of 25° C.).

Aromatic polycarbonate homopolymers can be manufactured by known processes, such as, for example and as mentioned above, by reacting a dihydroxy-substituted aromatic hydrocarbon with a carbonate precursor, such as phosgene, in accordance with methods set forth in the above-cited literature and in U.S. Pat. No. 4,123,436, or bytransesterification processes such as are disclosed in U.S. Pat. No. 3,153,008, as well as other processes known to those skilled in the art.

It is also possible to employ two or more different dihydroxy-substituted aromatic hydrocarbons or a copolymer of a dihydroxy-substituted aromatic hydrocarbon with a glycol or with a hydroxy- or acid-terminated polyester or with a dibasic acid or hydroxy acid in the event a carbonate copolymer rather than a homopolymer is desired for use in the preparation of polycarbonate. Branched polycarbonates are also useful, such as are described in U.S. Pat. No. 4,001,184. Also, there can be utilized blends of linear polycarbonate and branched polycarbonate. Moreover, blends of any of the above polycarbonate homopolymers, polyestercarbonate copolymers and polyarylates may be employed.

An exemplary polycarbonate comprises structural units derived from 2,2-bis(4-hydroxyphenyl)propane (bisphenol A) and phosgene, commercially available under the trade designation LEXAN from General Electric Company.

The polycarbonate homopolymers are high molecular weight and have an intrinsic viscosity, as determined in chloroform at 25° C. of about 0.3 to about 1.5 dl/gm, or, more specifically, about 0.45 to about 1.0 dl/gm. These polycarbonates may be branched or unbranched and generally will have a weight average molecular weight of about 10,000 to 200,000, or, more specifically, about 20,000 to about 100,000 as measured by gel permeation chromatography.

Compositions may comprise 1% to about 50% by weight of fiber based on the weight of the entire composition. In particular embodiments compositions may comprise about 10% to about 40% by weight of fiber based on the weight of the entire composition Any rigid fiber may be used, for example, glass fibers, carbon fibers, metal fibers, ceramic fibers or whiskers, and the like. In one embodiment glass fibers are employed. Exemplary fibers typically have a modulus of greater than or equal to about 6,800 megapascals. The fiber may be chopped or continuous. The fiber may have various cross-sections, for example, round, crescent, bilobal, trilobal, rectangular and hexagonal.

Exemplary fibers will have a diameter of about 5 to about 25 microns, or, more specifically a diameter of about 6 to 17 microns. In some applications it may be desirable to treat the surface of the fiber with a chemical coupling agent to improve adhesion to a thermoplastic resin in the composition. Examples of useful coupling agents are alkoxy silanes and alkoxy zirconates. Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

In preparing the molding compositions it is convenient to use fiberglass in the form of chopped strands of about 3 millimeters to about 15 millimeters long. In articles molded from the compositions on the other hand shorter lengths will typically be encountered because during compounding considerable fragmentation may occur.

The compositions may additionally comprise a non-fibrous inorganic filler, which may impart additional beneficial properties to the compositions such as thermal stability, increased density, stiffness and/or texture. Typical non-fibrous inorganic fillers include, but are not limited to, alumina, amorphous silica, alumino silicates, mica, clay, talc, glass flake, glass microspheres, metal oxides such as titanium dioxide, zinc sulfide, ground quartz, and the like. In various embodiments the amount of non-fibrous filler may be in a range of between about 1 wt. % and about 50 wt. % based on the weight of the entire composition.

In some embodiments combinations of glass fibers, carbon fibers or ceramic fibers with a flat, plate-like filler, for example mica or flaked glass, may give enhanced properties. Typically, the flat, plate-like filler has a length and width at least ten times greater than its thickness, where the thickness is 1 to about 1000 microns. Combinations of rigid fibrous fillers with flat, plate-like fillers may reduce warp of the molded article.

It has unexpectedly been found that salts of sulfonic acids act as both flame retardant and flow aids for compositions comprising fiber reinforcement. In various embodiments the compositions comprise a flow improving amount of at least one sulfonate salt selected from the group consisting of. fluoroalkyl sulfonate salts, aryl sulfonate salts and alkyl aryl sulfonate salts. In some particular embodiments suitable salts of sulfonic acids are selected from those having the following formulas:

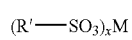 Formula (XIII)

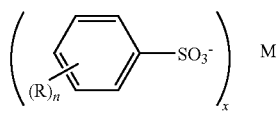 Formula (XIV)

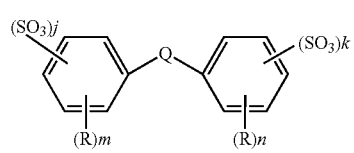 Formula (XV)

where R' may be C1- C40 alkyl, or C1-C40 fluoroalkyl. In some embodiments R' is a C4-C8 perfluoroalkyl group. R is independently for each substitution a C1-C40 alkyl group or alkyl-, arylalkyl- or aromatic ether group, M is a metal selected from the group of alkali metals and alkaline earth metals; x is the oxidation state of the metal, M; and j, k, m and n are each integers ranging from 0 to 5 subject to the limitation that j+k is at least 1 and subject to the further limitation that j+m is less than or equal to 5 and k+n is less than or equal to 5. In some particular embodiments j is zero and k is one. In some embodiments R is an alkyl group having from 3 to 40 carbon atoms, or, more specifically, 4 to 20 carbon atoms, or, even more specifically, 4 to 12 carbon atoms. The linking group Q is typically —$SO_2$— or —O—. The metals may be selected from the group consisting of periodic table Group IA metals, or, more specifically can be sodium and potassium. When the sulfonic acid salts are incorporated into a polymer for a flow improving and flame retarding effect generally an amount effective to produce a retardation in combustion is employed. This amount can be about 0.01 weight percent to about 5.0 weight percent of the total composition or, more specifically, about 0.02 weight percent to about 1.0 weight percent of the total composition, or, even more specifically, about 0.05 weight percent to about 0.15 weight percent of the total composition In some particular embodiments suitable sulfonate salts comprise perfluorobutyl potassium sulfonate salt (PFBKS), potassium sulfone sulfonate (KSS) and sodium dodecylbenzene sulfonate (NaDBS). Mixtures of sulfonate salts may also be employed.

In some embodiments the compositions further comprise a fluoropolymer in an amount that is effective to provide anti-drip properties to the resin composition. When present, the amount of fluoropolymer is typically 0.01 to 2.0 pbw fluoropolymer per 100 pbw of the thermoplastic resin composition. Suitable fluoropolymers and methods for making such fluoropolymers are known; see, for example, U.S. Pat. Nos. 3,671,487, 3,723,373 and 3,383,092. Suitable fluoropolymers include homopolymers and copolymers that comprise structural units derived from one or more fluorinated alpha-olefin monomers. The term "fluorinated alpha-olefin monomer" means an alpha-olefin monomer that includes at least one fluorine atom substituent. Suitable fluorinated alpha-olefin monomers include, for example, fluoroethylenes such as, for example, $CF_2$=$CF_2$, $CHF$=$CF_2$, $CH_2$=$CF_2$ and $CH_2$=$CHF$ and fluoropropylenes such as, for example, $CF_3CF$=$CF_2$, $CF_3CF$=$CHF$, $CF_3CH$=$CF_2$, $CF_3CH$=$CH_2$, $CF_3CF$=$CHF$, $CHF_2CH$=$CHF$ and $CF_3CF$=$CH_2$.

Suitable fluorinated alpha-olefin copolymers include copolymers comprising structural units derived from two or more fluorinated alpha-olefin monomers such as, for example, poly(tetrafluoroethylene-hexafluoroethylene), and copolymers comprising structural units derived from one or more fluorinated monomers and one or more non-fluorinated monoethylenically unsaturated monomers that are copolymerizable with the fluorinated monomers such as, for example, poly(tetrafluoroethylene-ethylene-propylene) copolymers. Suitable non-fluorinated monoethylenically unsaturated monomers include for example, alpha-olefin monomers such as, for example, ethylene, propylene, butene, acrylate monomers such as for example, methyl methacrylate, butyl acrylate, and the like. In one embodiment, the fluoropolymer is a poly(tetrafluoroethylene) homopolymer (PTFE).

Since direct incorporation of a fluoropolymer into a thermoplastic resin composition tends to be difficult, it is often preferred that the fluoropolymer be pre-blended in some manner with a second polymer, such as for, example, an aromatic polycarbonate, polyestercarbonate, polyarylate, polysulfone or polyimide resin. For example, an aqueous dispersion of fluoropolymer and a polycarbonate resin may be steam precipitated to form a fluoropolymer concentrate for use as a drip inhibitor additive in thermoplastic resin compositions, as disclosed, for example, in U.S. Pat. No. 5,521,230.

The composition may further comprise a mold release agent to aid in de-bonding shaped parts from molding equipment. Examples of mold release agents are alkyl carboxylic acids or esters, for example, stearic acid, behenic acid, pentaerythritol tetrastearate, glycerin tristearate and ethylene glycol distearate. Both aliphatic and aromatic carboxylic acids and their alkyl esters may be employed as mold release agents. Polyolefins such as high density polyethylene, linear low density polyethylene, low density polyethylene and similar polyolefin homopolymers and copolymers can also be used a mold release agents. When present, mold release agents are typically present in the compositions at 0.05-1.0% by weight of the entire composition or at 0.1-0.5% by weight of the entire composition. In some embodiments mold release agents will have high molecular weight typically greater than about 300 to prevent loss of the release agent from the molten polymer composition during melt processing.

The composition may be formed into shaped articles by a variety of common processes for shaping molten polymers such as injection molding, compression molding, extrusion and gas assist injection molding. Examples of such articles include, but are not limited to, electrical connectors, enclosures for electrical equipment, automotive engine parts, lighting sockets and reflectors, electric motor parts, power distribution equipment, communication equipment and the like, including devices that have molded in snap fit connectors.

Without further elaboration, it is believed that one skilled in the art can, using the description herein, make and use the described thermoplastic compositions to their fullest extent. The following examples are included to provide additional guidance to those skilled in the art. The examples provided are merely representative. Accordingly, these examples are not intended to limit the invention, as defined in the appended claims, in any manner. Examples of the invention are designated by numbers. Control examples are designated by letter.

EXAMPLES

The ingredients of the compositions shown in the tables below were tumble blended and then extruded on a 64 millimeter vacuum vented, single screw extruder at a barrel and die head temperature of between 260 and 315 degrees C. and about 80 rpm screw speed. The extrudate was cooled through a water bath prior to being chopped into pellets. Test parts were injection molded on a Newberry 150 ton molding machine with a set temperature of approximately 295 TO 340° C. The pellets were dried for 3-4 hours at about 150° C. in a forced air, circulating oven prior to injection molding.

Polyetherimide was a polymer of bisphenol A dianhydride and meta-phenylene diamine available as ULTEM 1000 from the General Electric Company, with Mw 34,000.

Polyestercarbonate was a polymer made by reaction of bisphenol A with iso- and terephthaloyl chloride and phosgene. The polyestercarbonate contained 30 wt. % terephthalate ester, 30 wt. % isophthalate ester, and 40 wt. % carbonate, and had a Mw of 28,350. Bisphenol A polycarbonate, had a Mw of 24,000 obtained from GE Plastics.

Fiberglass OC165A was from the Owens Corning Company. It was an "E" glass treated with an amino silane coupling agent and had a diameter of 11 microns.

Samples were injection molded and tested for flammability using Underwriters Laboratory (UL) test 94. Under this test a sample with a rating of V-0 has the best resistance to ignition. Samples were burned in a vertical orientation after aging for 3 days at 50% relative humidity Melt flow was measured as MVR (melt volume rate) using ASTM test method D1238 at 337° C. using a die 8 millimeters long and 9.5 millimeters wide with an orifice of 2 millimeters and with a load of 6.7 kg. Pellets were dried for at least 1 hour at 150° C. prior to testing. Component amounts in all the Tables are in parts by weight (pbw).

Table 1 shows blends comprising polyestercarbonate with polyetherimide (PEI) and 10 pbw fiber glass. Note that Examples 1-4 of the invention containing perfluorobutyl potassium sulfonate salt (PFBKS) all show higher MVR (higher melt flow) than the Control Examples having the same PEI to PEC polymer ratio and the same amount of glass without PFBKS. Note that in these blends higher levels of the lower Tg PEC resin also gave higher flow (compare Control Examples A, B and C). The PFBKS comprising blends also showed reduced flammability as measured by UL-94 testing on 1.6 and 0.8 millimeter (mm) test bars (compare Examples 1 and 2 vs. Control Example A, and Example 3 vs. Control Example B).

Addition of the fiber glass made the blends easier to compound and strand during extrusion. This was especially noticeable in Control Example B and Example 3 containing equal amounts of PEC and PEI polymer.

TABLE 1

|  | A | 1 | 2 | B | 3 | C | 4 |
|---|---|---|---|---|---|---|---|
| Glass fiber | 10 | 10 | 10 | 10 | 10 | 10 | 10 |
| PEI | 10 | 10 | 10 | 45 | 45 | 80 | 80 |
| PEC | 80 | 80 | 80 | 45 | 45 | 10 | 10 |
| PFBKS | 0 | 0.04 | 0.08 | 0 | 0.08 | 0 | 0.08 |
| MVR | 25 | 29.1 | 29.2 | 20.7 | 25.3 | 17 | 18.5 |
| UL-94 at 1.6 mm | V-2 | V-0 | V-0 | V-1 | V-0 | V-0 | V-0 |
| UL-94 at 0.8 mm | — | V-2 | V-2 | V-2 | V-0 | V-0 | V-0 |

Table 2 shows blends comprising polyestercarbonate with polyetherimide, and 30 pbw fiber glass. Note that Examples 5-7 of the invention containing PFBKS all show good melt flow. Note in Examples 5, 6 and 7 that the PFBKS salt is effective at low levels and that increasing amounts of salt give even higher flow. All samples pass the UL-94 test for flammability at 0.8 mm. Addition of the fiber glass made the blends easier to compound and strand during extrusion.

TABLE 2

|  | D | 5 | 6 | 7 |
|---|---|---|---|---|
| Glass fiber | 30 | 30 | 30 | 30 |
| PEI | 35 | 35 | 35 | 35 |
| PEC | 35 | 35 | 35 | 35 |
| PFBKS | 0 | 0.08 | 0.12 | 0.15 |
| MVR | 14 | 29.8 | 32.4 | 37.5 |
| UL-94 at 0.8 mm | V-0 | V-0 | V-0 | V-0 |

Table 3 shows blends comprising polyestercarbonate with polyetherimide and 40 pbw fiber glass. Note that Examples 8-12 of the invention containing PFBKS all show higher MVR than the corresponding Control Examples. All samples with PFBKS show better UL-94 test results than the Control Examples with no sulfonate salt. Addition of the fiber glass made the blends easier to compound and strand during extrusion. This was especially noticeable in Example 11 containing equal amounts of PEC and PEI polymer.

TABLE 3

|  | E | 8 | F | 9 | 10 | 11 | 12 |
|---|---|---|---|---|---|---|---|
| Glass fiber | 40 | 40 | 40 | 40 | 40 | 40 | 40 |
| PEI | 50 | 50 | 10 | 10 | 10 | 30 | 45 |
| PEC | 10 | 10 | 50 | 50 | 50 | 30 | 15 |
| PFBKS | 0 | 0.08 | 0 | 0.08 | 0.15 | 0.08 | 0.06 |
| MVR | 16.4 | 19.2 | 40.2 | 52.9 | 66.3 | 37.7 | 17.9 |
| UL-94 at 1.6 mm | V-0 | V-0 | V-1 | V-0 | V-0 | V-0 | V-0 |
| UL-94 at 0.8 mm | V-1 | V-0 | V-2 | V-0 | V-1 | V-1 | V-1 |

Table 4 shows examples of improved flow using PFBKS in 30 pbw glass filled PEI and PEC compositions compared to the controls with no PFBKS (Control Examples G and H vs. Examples 13 and 14). Note the improved FR rating of the PEC composition with the PFBKS salt (Example 14) compared to the Control Example H.

TABLE 4

|  | G | 13 | H | 14 |
|---|---|---|---|---|
| Glass Fiber | 30 | 30 | 30 | 30 |
| PEI | 70 | 70 | — | — |
| PEC | — | — | 70 | 70 |
| PFBKS | — | 0.15 | — | 0.15 |
| MVR at 337° C. | 9.56 | 11.60 | 60.0 | 66.1 |
| UL-94 at 0.8 mm | V-0 | V-0 | V-1 | V-0 |

Table 5 shows examples of improved flow using PFBKS, KSS (potassium sulfone sulfonate) or NaDBS (sodium dodecylbenzene sulfonate) in 30 pbw glass filled PEI and PEC blend compositions compared to Control Example I with no salt. These data show that improved flow and flame retardancy can be achieved with a variety of sulfonate salts.

TABLE 5

|  | I | 15 | 16 | 17 |
| --- | --- | --- | --- | --- |
| Glass Fiber | 30 | 30 | 30 | 30 |
| PEI | 35 | 35 | 35 | 35 |
| PEC | 35 | 35 | 35 | 35 |
| PFBKS | — | 0.15 | — | — |
| KSS | — | — | 0.15 | — |
| NaDBS | — | — | — | 0.15 |
| MVR at 337° C. | 33.12 | 45.73 | 53.50 | 53.38 |
| UL94-Flame at 0.8 mm | V-0 | V-0 | V-0 | V-0 |

Table 6 shows examples of improved flow using the PFBKS salt with fiber glass in polysulfone resin blends with either PEC (Examples 18 and 19) or with PEI (Example 20). Example 21 shows improved flow using sulfonate salt in a 30 pbw glass filled polysulfone composition without an additional thermoplastic resin. Polysulfone resin was UDEL M-200NT from Solvay Co.

TABLE 6

|  | J | 18 | K | 19 | L | 20 | M | 21 |
| --- | --- | --- | --- | --- | --- | --- | --- | --- |
| Glass Fiber | 30 | 30 | 10 | 10 | 30 | 30 | 30 | 30 |
| PEI | — | — | — | — | 35 | 35 | — | — |
| Polysulfone | 35 | 35 | 45 | 45 | 35 | 35 | 70 | 70 |
| PEC | 35 | 35 | 45 | 45 | — | — | — | — |
| PFBKS | — | 0.15 | — | 0.15 | — | 0.15 | — | 0.15 |
| MVR at 337° C. | 45.1 | 49.14 | 33.52 | 40.60 | 11.89 | 13.12 | 14.17 | 15.02 |
| UL94-Flame at 0.8 mm | V-0 | V-0 | V-1 | V-0 | V-1 | V-0 | V-1 | V-0 |

Table 7 shows Control Examples N-Q where perfluorobutyl potassium sulfonate shows no appreciable improvement in flow in a PEI composition with no glass fiber.

TABLE 7

|  | N | O | P | Q |
| --- | --- | --- | --- | --- |
| PEI | 100 | 99.95 | 99.92 | 99.9 |
| PFBKS | 0 | 0.05 | 0.08 | 0.1 |
| MVR at 337° C. | 20.0 | 19.1 | 20.5 | 20.1 |

While the invention has been illustrated and described in typical embodiments, it is not intended to be limited to the details shown, since various modifications and substitutions can be made without departing in any way from the spirit of the invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and published articles cited herein are incorporated herein by reference.

The invention claimed is:

1. A thermoplastic resin composition consisting of:
   (a) a polyimide, a a polyether sulfone, a polyaryl ether sulfone, a polyphenylene ether sulfone or mixture thereof;
   (b) about 10% to about 40% by weight of the entire composition of a fibrous reinforcement selected from the group consisting of: fiber glass, carbon fiber and ceramic fiber; and
   (c) about 0.05 to about 0.15 weight percent, with respect to the total weight of the composition, of a sulfonate salt, and
   (d) one or more optional components selected from the group consisting of a fluoropolymer, a mold release agent, and non-fibrous mineral filler;
   wherein the composition has a melt flow of from 20 to 60 millimeters/10 minutes as measured by ASTM Test Method D 1238 at 337 degrees C. using a die 8 millimeters long and 9.5 millimeters with an orifice of 2 millimeters with a load of 6.7 kilograms.

2. The composition of claim 1 wherein the sulfonate salt is an alkali metal salt or alkaline earth metal salt.

3. The composition of claim 2 wherein the sulfonate salt is selected from the group consisting of: fluoroalkyl sulfonate salts, aryl sulfonate salts, alkyl aryl sulfonate salts and mixtures thereof.

4. The composition of claim 3 wherein the sulfonate salt is selected from the group consisting of: perfluorobutyl potassium sulfonate, potassium sulfone sulfonate and sodium dodecylbenzene sulfonate.

5. The composition of claim 1 wherein the polyimide is a selected from the group consisting of polyetherimides and polyetherimide sulfones.

6. The composition of claim 1 which has an Underwriters Laboratory (UL) 94 testing value of V-0 at a test part thickness of less than or equal to 1.6 mm.

7. The composition of claim 1 which is substantially free of bromine and chlorine.

8. The composition of claim 1 wherein the fluoropolymer is present at a level of from 0.5% to 5.0% by weight of the entire composition.

9. The composition of claim 1 wherein the fluoropolymer is poly(tetrafluoroethylene).

10. The composition of claim 1 wherein the non-fibrous mineral filler is present in an amount of 1-50% by weight of the entire composition.

11. The composition of claim 10 wherein the non-fibrous filler is selected from the group consisting of: mica, clay, talc, glass flake, milled glass, barium sulfate, titanium dioxide, zinc sulfide, silica and zeolites.

12. The composition of claim 1 wherein the mold release agent is selected from the group consisting of: polyolefins and alkyl esters of carboxylic acids.

13. A thermoplastic resin composition consisting of:
   (a) a polyetherimide, a a polyether sulfone, a polyaryl ether sulfone, a polyphenylene ether sulfone or mixture thereof;
   (b) fiber glass;
   (c) about 0.05 to about 0.15 weight percent, with respect to the total weight of the composition of a sulfonate salt selected from the group consisting of perfluorobutyl potassium sulfonate, potassium sulfone sulfonate and sodium dodecylbenzene sulfonate; and
   (d) an alkyl ester of a carboxylic acid;
   wherein said composition has a melt flow of from 20 to 60 milliliters/10 minutes as measured by ASTM Test Method D1238 at 337 degrees C. using a die 8 millimeters long and 9.5 millimeters wide with an orifice of 2 millimeters with a load of 6.7 kilograms.

14. The composition of claim 13 wherein the polyetherimide comprises structural units derived from at least one dianhydride selected from the group consisting of 2,2-bis[4-(3,4- dicarboxyphenoxy)phenyl]propane dianhydride, 2,2-bis[4-(2,3-dicarboxyphenoxy)phenyl]propane dianhydride; 2- [4-(3,4-dicarboxyphenoxy)phenyl]-2-[4-(2,3-dicarboxyphenoxy)phenyl] propane dianhydride; and structural units derived from at least one diamine selected from the group consisting of meta- phenylene diamine, para-phenylene diamine, diamino diphenyl sulfone and oxydianiline.

15. A thermoplastic resin composition consisting of:
(a) a polyimide, a a polyether sulfone, a polyaryl ether sulfone, a polyphenylene ether sulfone or mixture thereof;
(b) an amorphous polyestercarbonate or polyarylate polymer, or mixture thereof, comprising recurring units of the formula

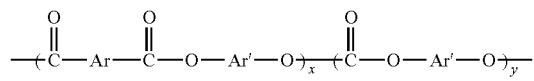

wherein Ar is a divalent aromatic residue of a dicarboxylic acid or mixture of dicarboxylic acids and Ar' is a divalent aromatic residue of a dihydroxy-substituted aromatic compound or mixture of dihydroxy-substituted aromatic compounds and wherein, based on mole percent, x and y each have a value of between 0 and 100 percent and the total of x and y is 100 percent;
(c) a fibrous reinforcement selected from the group consisting of: fiber glass, carbon fiber and ceramic fiber;
(d) about 0.05 to about 0.15 weight percent, with respect to the total weight of the composition, of a sulfonate salt, and
(e) one or more optional components selected from the group consisting of a fluoropolymer, a mold release agent, and non-fibrous mineral filler.

16. The composition of claim 15 wherein the polyimide is a selected from the group consisting of polyetherimides and polyetherimide sulfones.

17. The composition of claim 15 wherein said polyarylate resin comprises structural units derived from bisphenol A.

18. The composition of claim 15 wherein y is 0 and said amorphous polymer is a polyarylate resin.

19. The composition of claim 15 wherein said amorphous polymer is a polyestercarbonate resin.

20. The composition of claim 19 wherein Ar is derived from the aromatic residue of isophthalic acid, terephthalic acid or a mixture thereof.

21. The composition of claim 15 wherein the sulfonate salt is an alkali metal or alkaline earth metal salt.

22. The composition of claim 21 wherein the sulfonate salt is selected from the group consisting of: fluoroalkyl sulfonate salts, aryl sulfonate salts and alkyl aryl sulfonate salts.

23. The composition of claim 22 wherein the sulfonate salt is selected from the group consisting of: perfluorobutyl potassium sulfonate, potassium sulfone sulfonate and sodium dodecylbenzene sulfonate.

24. The composition of claim 15 wherein the fibrous reinforcement is present at a level of from 1% to 50% by weight of the entire composition.

25. The composition of claim 24 wherein the fibrous reinforcement is present at a level of from 10% to 40% by weight of the entire composition.

26. The composition of claim 15 wherein the polyimide is a selected from the group consisting of polyetherimides and polyetherimide sulfones.

27. The composition of claim 15 which has an Underwriters Laboratory (UL) 94 testing value of V-0 at a test part thickness of less than or equal to 1.6 mm.

28. The composition of claim 15 which is substantially free of bromine and chlorine.

29. The composition of claim 15 wherein the fluoropolymer is present at a level of from 0.5% to 5.0% by weight of the entire composition.

30. The composition of claim 15 wherein the fluoropolymer is poly(tetrafluoroethylene).

31. The composition of claim 15 wherein the non-fibrous mineral filler is present in an amount of 1-50% by weight of the entire composition.

32. The composition of claim 31 wherein the non-fibrous filler is selected from the group consisting of: mica, clay, talc, glass flake, milled glass, barium sulfate, titanium dioxide, zinc sulfide, silica and zeolites.

33. The composition of claim 15 wherein the composition has a melt flow of from 20 to 60 milliliters/10 minutes as measured by ASTM Test Method D1238 at 337 degrees C. using a die 8 millimeters long and 9.5 millimeters wide with an orifice of 2 millimeters with a load of 6.7 kilograms.

34. The composition of claim 15 wherein the mold release agent is selected from the group consisting of: polyolefins and alkyl esters of carboxylic acids.

35. A thermoplastic resin composition consisting of:
(a) a polyetherimide, a a polyether sulfone, a polyaryl ether sulfone, a polyphenylene ether sulfone or mixture thereof;
(b) an amorphous polyestercarbonate comprising recurring units of the formula

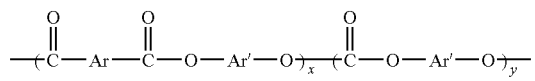

wherein Ar is a divalent aromatic residue of a dicarboxylic acid or mixture of dicarboxylic acids and Ar' is a divalent aromatic residue of a dihydroxy-substituted aromatic compound or mixture of dihydroxy-substituted aromatic compounds and wherein, based on mole percent, x and y each have a value of between 1 and 99 percent and the total of x and y is 100 percent;
(c) fiber glass;
(d) about 0.05 to about 0.15 weight percent, with respect to the total weight of the composition of a sulfonate salt selected from the group consisting of perfluorobutyl potassium sulfonate, potassium sulfone sulfonate and sodium dodecylbenzene sulfonate; and
(e) an alkyl ester of a carboxylic acid;
wherein said composition has a melt flow of from 20 to 60 milliliters/10 minutes as measured by ASTM Test Method D1238 at 337 degrees C. using a die 8 millimeters long and 9.5 millimeters wide with an orifice of 2 millimeters with a load of 6.7 kilograms.

36. The composition of claim 35 wherein the polyetherimide comprises structural units derived from at least one dianhydride selected from the group consisting of 2,2-bis[4-(3,4-dicarboxyphenoxy)phenyl] propane dianhydride, 2,2-bis[4-(2,3-dicarboxyphenoxy)phenyl] propane dianhydride; 2- [4-(3,4-dicarboxyphenoxy)phenyl] -2-[4-(2,3-dicarboxyphenoxy)phenyl] propane dianhydride; and structural units derived from at least one diamine selected from the group consisting of meta- phenylene diamine, para-phenylene diamine, diamino diphenyl sulfone and oxydianiline.

37. A thermoplastic resin composition consisting of:
(a) a polyimide, a a polyether sulfone, a polyaryl ether sulfone, a polyphenylene ether sulfone or mixture thereof;
(b) a fibrous reinforcement selected from the group consisting of: fiber glass, carbon fiber and ceramic fiber; and
(c) about 0.05 to about 0.15 weight percent, with respect to the total weight of the composition, of a sulfonate salt.

* * * * *